United States Patent
Mattetti et al.

(10) Patent No.: US 11,645,595 B2
(45) Date of Patent: May 9, 2023

(54) PREDICTIVE CAPACITY OPTIMIZER

(71) Applicant: International Business Machines Corporation, Armonk, NY (US)

(72) Inventors: Massimiliano Mattetti, Dublin (IE); Elizabeth Daly, Dublin (IE); Oznur Alkan, Dublin (IE); Bei Chen, Blanchardstown (IE); Rahul Nair, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/121,812

(22) Filed: Dec. 15, 2020

(65) Prior Publication Data
US 2022/0188727 A1    Jun. 16, 2022

(51) Int. Cl.
| | |
|---|---|
| *G06Q 10/0631* | (2023.01) |
| *G06Q 30/0202* | (2023.01) |
| *G06N 5/04* | (2023.01) |
| *G06N 20/00* | (2019.01) |

(52) U.S. Cl.
CPC ......... *G06Q 10/06313* (2013.01); *G06N 5/04* (2013.01); *G06N 20/00* (2019.01); *G06Q 10/06312* (2013.01); *G06Q 30/0202* (2013.01)

(58) Field of Classification Search
None
See application file for complete search history.

(56) References Cited

U.S. PATENT DOCUMENTS

| | | | |
|---|---|---|---|
| 6,542,912 B2 | 4/2003 | Meltzer et al. | |
| 7,366,706 B2 | 4/2008 | Chang et al. | |
| 7,590,508 B1 * | 9/2009 | Saghier | G06Q 10/0639 703/22 |

(Continued)

FOREIGN PATENT DOCUMENTS

| | | |
|---|---|---|
| CN | 108090640 A | 5/2018 |
| CN | 110400182 A | 11/2019 |

(Continued)

OTHER PUBLICATIONS

Singh, Sarabjeet, and Marc St-Hilaire. "Prediction-Based Resource Assignment Scheme to Maximize the Net Profit of Cloud Service Providers." Communications and Network 12.02 (2020): 74. (Year: 2020).*

(Continued)

*Primary Examiner* — Timothy Padot
*Assistant Examiner* — Derick J Holzmacher
(74) *Attorney, Agent, or Firm* — Cantor Colburn LLP; Kurt Goudy (57) ABSTRACT

Embodiments of the invention are directed to techniques that include predicting, by a computer system, a number of predicted opportunities and signatures of the predicted opportunities expected in a time window. Based on the signatures of the predicted opportunities, the computer system generates a listing of entities ranked according to signatures of the predicted opportunities. The computer system selects the entities to be assigned to the predicted opportunities based, at least in part, on computing capacity related to sales while accounting for any current opportunities having been assigned to the entities.

20 Claims, 6 Drawing Sheets

(56) References Cited

U.S. PATENT DOCUMENTS

| | | | |
|---|---|---|---|
| 7,881,957 B1* | 2/2011 | Cohen | G06Q 30/08 |
| 7,885,851 B2 | 2/2011 | Hurt et al. | |
| 7,890,309 B2 | 2/2011 | Bhaskaran et al. | |
| 8,121,883 B2* | 2/2012 | Johnson | G06Q 10/06312 705/348 |
| 8,311,886 B2 | 11/2012 | Vijay et al. | |
| 8,352,301 B1* | 1/2013 | Starr | G06Q 10/00 705/7.29 |
| 8,548,871 B2 | 10/2013 | Walker et al. | |
| 8,626,572 B2 | 1/2014 | Colliat et al. | |
| 8,645,186 B2 | 2/2014 | Moukas et al. | |
| 8,744,902 B2 | 6/2014 | Nguyen et al. | |
| 9,104,971 B1* | 8/2015 | Chamness | G06Q 30/02 |
| 9,116,731 B2* | 8/2015 | Tung | G06F 9/5072 |
| 9,985,847 B2* | 5/2018 | Tung | H04L 41/5009 |
| 10,069,907 B2* | 9/2018 | Tung | H04L 41/5019 |
| 10,284,415 B1* | 5/2019 | Alabsi | H04L 41/0897 |
| 11,295,251 B2* | 4/2022 | Chang | G06Q 10/063112 |
| 2003/0014373 A1 | 1/2003 | Perge et al. | |
| 2004/0210489 A1 | 10/2004 | Jackson et al. | |
| 2006/0155596 A1 | 7/2006 | Thier | |
| 2006/0212337 A1 | 9/2006 | Vayghan et al. | |
| 2006/0259499 A1 | 11/2006 | Moulckers et al. | |
| 2006/0271581 A1 | 11/2006 | Sanjar et al. | |
| 2008/0183530 A1 | 7/2008 | Bagchi et al. | |
| 2008/0195447 A1* | 8/2008 | Bouillet | G06Q 30/0202 705/7.31 |
| 2009/0204459 A1* | 8/2009 | Johnson | G06Q 10/0633 705/7.25 |
| 2010/0088205 A1* | 4/2010 | Robertson | G06Q 20/102 705/400 |
| 2011/0246260 A1 | 10/2011 | Gilbert et al. | |
| 2012/0290353 A1* | 11/2012 | Jain | G06Q 10/0631 705/7.23 |
| 2014/0046954 A1 | 2/2014 | Maclean et al. | |
| 2014/0067463 A1 | 3/2014 | Richter | |
| 2014/0122240 A1 | 5/2014 | Olsen et al. | |
| 2014/0236663 A1* | 8/2014 | Smith | G06Q 10/0633 705/7.27 |
| 2014/0278808 A1* | 9/2014 | Iyoob | G06Q 30/0206 705/7.35 |
| 2014/0280193 A1* | 9/2014 | Cronin | G06Q 30/0202 707/741 |
| 2014/0358606 A1* | 12/2014 | Hull | G06Q 10/063112 705/7.14 |
| 2015/0112756 A1* | 4/2015 | Subramanian | G06Q 30/0201 705/7.29 |
| 2016/0371625 A1* | 12/2016 | Mosley | G06Q 10/06393 |
| 2017/0111507 A1* | 4/2017 | McGann | H04L 67/535 |
| 2017/0237859 A1 | 8/2017 | Hedges | |
| 2018/0005253 A1 | 1/2018 | Megahed et al. | |
| 2018/0081868 A1 | 3/2018 | Willcock et al. | |
| 2018/0204164 A1 | 7/2018 | Murugan | |
| 2018/0268373 A1* | 9/2018 | Bheemavarapu | G06Q 10/1053 |
| 2019/0005570 A1 | 1/2019 | Goodman et al. | |
| 2019/0102462 A1* | 4/2019 | Botea | H04L 67/306 |
| 2019/0258983 A1* | 8/2019 | Thomaidou | G06Q 10/06398 |
| 2020/0151651 A1* | 5/2020 | Chang | G06Q 10/063118 |
| 2020/0159820 A1 | 5/2020 | Rodriguez et al. | |
| 2020/0387387 A1 | 12/2020 | Iijima et al. | |
| 2022/0050960 A1 | 2/2022 | Sanyasi et al. | |

FOREIGN PATENT DOCUMENTS

| | | | |
|---|---|---|---|
| WO | 200138976 A1 | 5/2001 | |
| WO | WO-0190998 A2 * | 11/2001 | G06Q 10/04 |
| WO | WO-2007092615 A2 * | 8/2007 | G06F 17/30398 |
| WO | 2007103646 A2 | 9/2007 | |
| WO | WO-2013192245 A2 * | 12/2013 | G06F 16/215 |

OTHER PUBLICATIONS

Toosi, Adel Nadjaran, et al. "Revenue maximization with optimal capacity control in infrastructure as a service cloud markets." IEEE transactions on Cloud Computing 3.3 (2014): 261-274. (Year: 2014).*

Carvalho, Marcus, Daniel A. Menascé, and Francisco Brasileiro. "Capacity planning for IaaS cloud providers offering multiple service classes." Future Generation Computer Systems 77 (2017): 97-111. (Year: 2017).*

Alkan et al., "Facilitating Information Technology Solution Templates," U.S. Appl. No. 17/121,797, filed Dec. 15, 2020.

Anonymous; "Selling through Microsoft's commercial marketplace"; Microsoft Partner Community; 2019; 14p.

AWS CloudFormation Templates, [online]; [retrieved on Dec. 23, 2020]; retrieved from the Internethttps://aws.amazon.com/cloudformation/resources/templates/.

Azure Marketplace; "Publishing guide for Azure applications solution template offers" microsoft.com; Apr. 22, 2020; 3p.

Baier et al.; "Sales-force performance analytics and optimization"; IBM J. RES. & DEV. vol. 56 No. 6 Paper 8 Nov./Dec. 2012; 10 p.

Chaudhry; "Understanding Azure Solution Templates"; trendmicro.com; 2016; 8p.

Furuhata et al. "Capacity Allocation with Competitive Retailers"; 8th International Conference on Electronic Commerce; 2006; 7p.

Lam et al. "Retail Sales Force Scheduling Based on Store Traffic Forecasting"; Journal of Retailing, vol. 74(1), pp. 61-88, 1998; 28p.

Lawrence et al.; "Analytics-driven solutions for customer targeting and sales force allocation" IBM Systems Journal, vol. 46, No. 4, 2007; 14p.

List of IBM Patents or Patent Applications Treated as Related; Date Filed: Dec. 24, 2020, 2 pages.

Megahed et al.; "An Optimization Approach to Services Sales Forecasting in A Multi-Staged Sales Pipeline"; 2016 IEEE International Conference on Services Computing; 7 p.

Morwitz, et al. When do purchase intentions predict sales?; International Journal of Forecasting 23 (2007) 347-364; 18 p.

Planet Together, [online]; [retrieved on Dec. 22, 2020]; retrieved from the Internethttps://www.planettogether.com/blog/optimize-capacity-planning-with-predictive-analytics.

Shambour et al.; An effective recommender system by unifying user and item trust information for B2B applications; Journal of Computer and System Sciences; 2015; 17p.

Vanguardr, [online]; [retrieved on Dec. 22, 2020]; retrieved from the Internethttps://www.vanguardsw.com/sales-capacity-planning/.

* cited by examiner

PREDICTIVE CAPACITY OPTIMIZER

BACKGROUND

The present invention generally relates to computer systems, and more specifically, to computer-implemented methods, computer systems, and computer program products configured and arranged for providing a predictive capacity optimizer.

Predictive analytics encompasses a variety of statistical techniques from data mining, predictive modelling, and machine learning, which analyze current and historical facts to make predictions about future or otherwise unknown events. In industry, predictive models exploit patterns found in historical and transactional data to identify risks and opportunities. Models capture relationships among many factors to allow assessment of risk or potential associated with a particular set of conditions, thereby helping to guide decision-making for candidate transactions. The defining functional effect of these technical approaches is that predictive analytics provide a predictive score (probability) for each individual (customer, employee, healthcare patient, product, vehicle, component, machine, or other organizational unit) in order to determine, inform, or influence organizational processes across large number operations.

SUMMARY

Embodiments of the present invention are directed to computer-implemented methods for providing a predictive capacity optimizer. A non-limiting example computer-implemented method includes predicting, by a computer system, a number of predicted opportunities and signatures of the predicted opportunities expected in a time window. Based on the signatures of the predicted opportunities, the computer system generates a listing of entities ranked according to signatures of the predicted opportunities. The computer system selects the entities to be assigned to the predicted opportunities based, at least in part, on computing capacity related to sales while accounting for any current opportunities having been assigned to the entities.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide computer-implemented methods, computer systems, and computer program products for providing predictive capacity optimization and/or a predictive capacity optimizer. According to one or more embodiments of the invention, a computer system is configured to predict the type/signature of new business opportunities that will arise over a specific time window. The type/signature of new business opportunities can include the size of a deal; a business sector such as government, public, and/or private; and a product family such as machine learning software applications, software application templates, computer security (including cybersecurity and information technology security (IT security)), etc. The computer system is configured to assign business entities (e.g., business partners) to current opportunities taking into account the requirements of future opportunities, all while avoiding overcommitting a business entity to a current opportunity, if the computer system predicts that a more demanding opportunity (which could be a more profitable opportunity) will arise soon to utilize more of the business capacity of the business entity.

A business entity (or sales resource) has a business capacity to provide a service and/or product using one or more computer systems. Business capacity and/or computing capacity (which can in turn relates to sales capacity) refers to the number of opportunities and the signatures/types of opportunities that a business entity can work on and/or perform at the same time using one or more computer systems. One or more embodiments of the invention are configured to avoid conditions where there is not full (and/or near full) utilization of computer systems (e.g., computing capacity) for respective business entities based on predicted opportunities.

Figure 1:
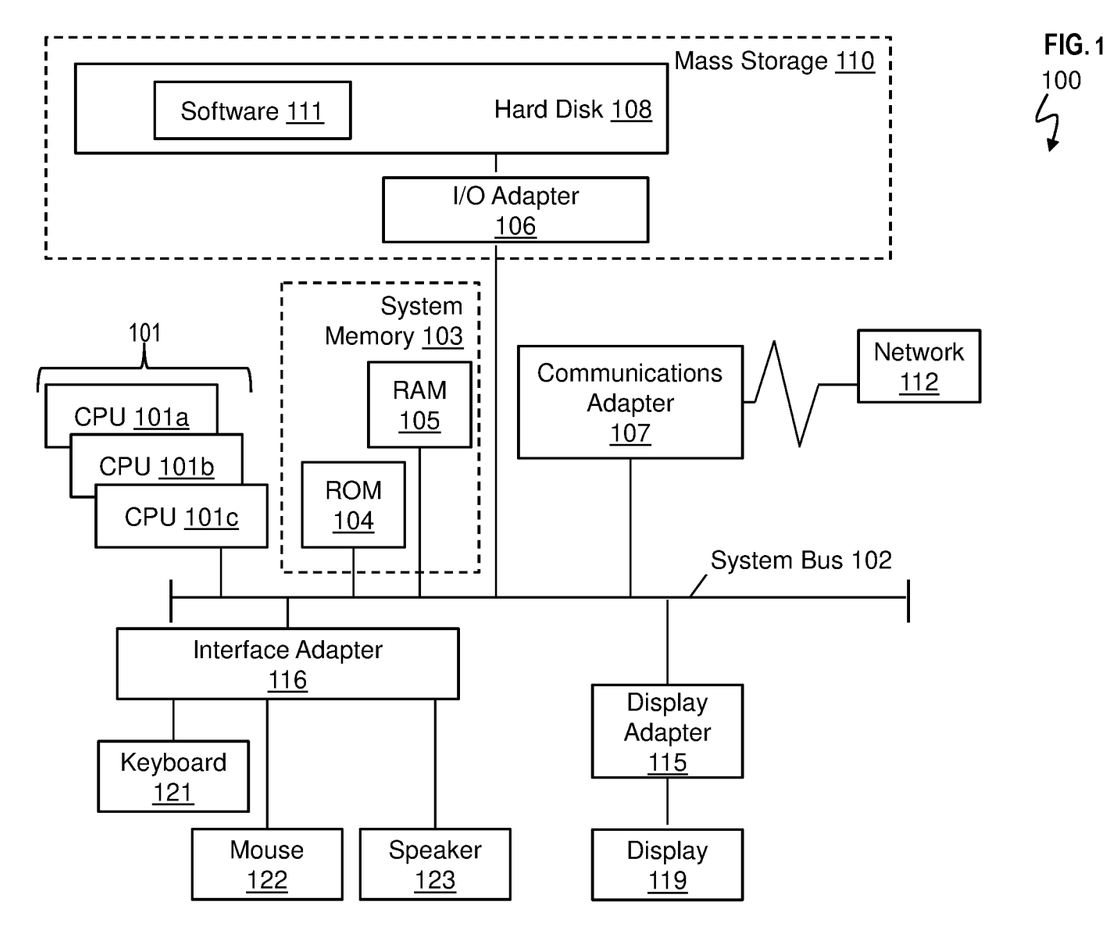
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 can be, for example, a server, desktop computer, laptop computer, tablet computer, or smartphone. In some examples, computer system 100 can be a cloud computing node. Computer system 100 can be described in the general context of computer system executable instructions, such as program modules, being executed by a computer system. Generally, program modules can include routines, programs, objects, components, logic, data structures, and so on that perform particular tasks or implement particular abstract data types.

Computer system 100 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and can include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 can be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 can be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which can be an outside network, enabling the computer system 100 to communicate with other such systems. In one embodiment, a portion of the system memory 103 and the mass storage 110 collectively store an operating system, which can be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 can be connected to one or more I/O buses that are connected to the system bus 102 via an intermediate bus bridge (not shown). A display 119 (e.g., a screen or a display monitor) is connected to the system bus 102 by the display adapter 115, which can include a graphics controller to improve the performance of graphics intensive applications and a video controller. A keyboard 121, a mouse 122, a speaker 123, etc., can be interconnected to the system bus 102 via the interface adapter 116, which can include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 can be a cellular network, a radio network, a wide area network (WAN), a local area network (LAN), or the Internet, among others. An external computing device can connect to the computer system 100 through the network 112. In some examples, an external computing device can be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 can be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
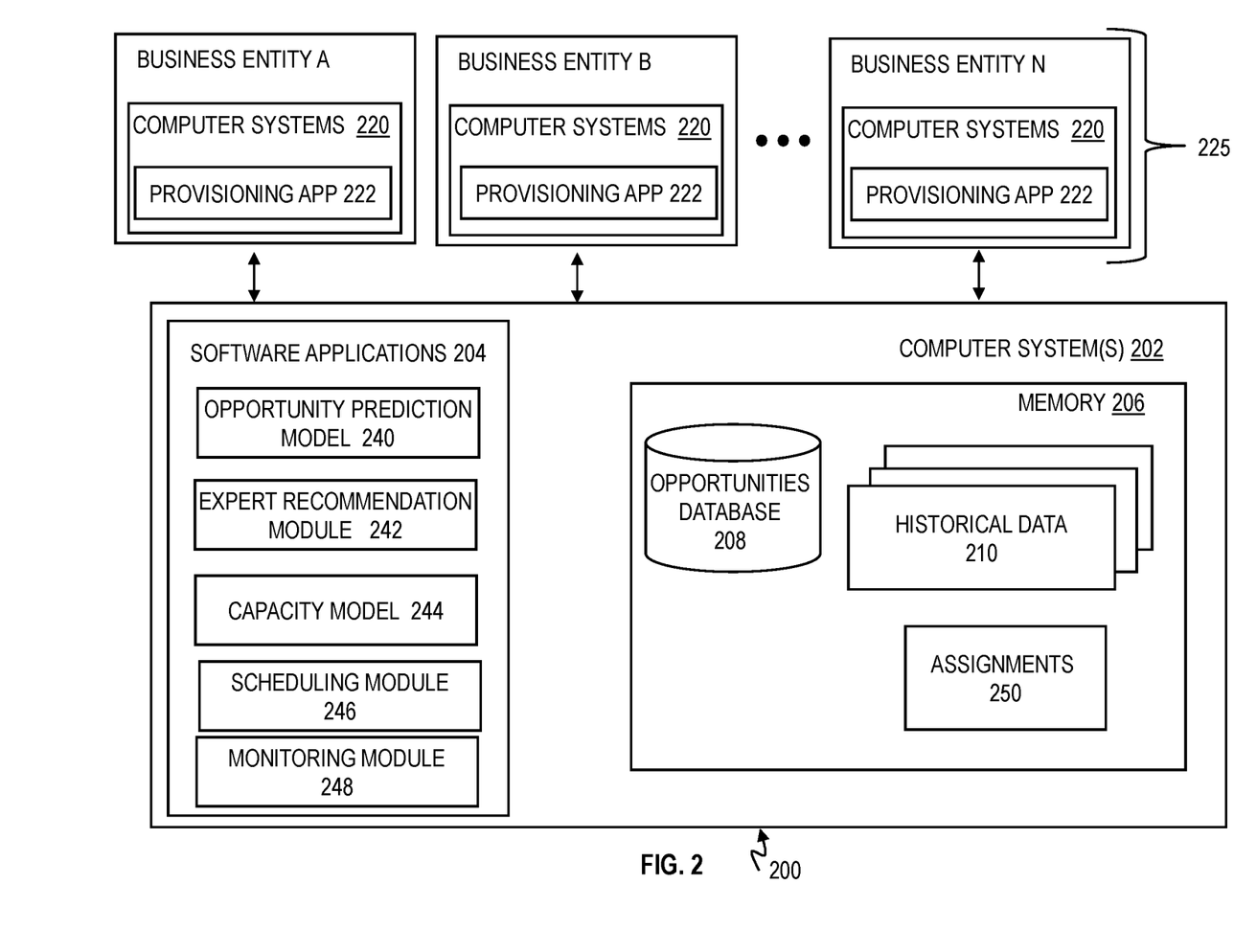
FIG. 2 depicts a block diagram of a system for predictive capacity optimization and/or a predictive capacity optimizer in accordance with one or more embodiments of the present invention.

FIG. 2 is a block diagram of a system 200 for providing predictive (business) capacity optimization and/or a predictive (business) capacity optimizer in accordance with one or more embodiments of the present invention. FIG. 2 depicts example business entities 225 each having one or more computers systems 202 coupled to computer systems 220. Computer system 202 can communicate with computer systems 220 over a wired and/or wireless network. Computer systems 202 can be representative of numerous computers in a datacenter providing services to various users and/or business entities 225. Computer systems 220 can be representative of numerous computer systems utilized to provide computer related services in accordance with their respective business entities 225. Computer system 202 includes software applications 204, and computer systems 220 include provisioning software applications 222. Computer systems 220 can interface directly with software applications 204 of computer system 202 and/or use provisioning software application 222 to interface with software applications 204. Provisioning software application 222 can allocate/provision utilization of computing resources on computer systems 220 including memory (including virtual memory), inputs/outputs, processors, software applications, templates for software applications, etc. Provisioning software applications 222 can also manage computing resources on computer systems 220 in accordance with assignments made by software applications 204 as discussed further herein. Software applications 204 can be implemented as software 111 executed on one or more processors 101, as discussed in FIG. 1. Similarly, provisioning software applications 222 can be implemented using software 111 configured to execute on one or more processors 101. Elements of computer system 100 can be used in and/or integrated into computers system 202 and computer systems 220.

Business entities 225 can include, for example, different business entities A, B, C, through N, where N represents the last business entity. Each of the business entities 225 using respective computer systems 220 has technological capabilities to provide one or more computer related services. In one or more embodiments, business entities 225 can represent various sellers and/or business partners associated with computer systems 202.

Historical data 210 stored in a database can be representative of numerous databases. The database can contain hundreds, thousands, and/or millions of documents, also referred to as "big data". In accordance with one or more embodiments, the enormous size of historical data 210 in databases requires management, processing, and search by a machine (such as computer system 202), for example, using computer-executable instructions, and historical data 210 in databases could not be practically managed, stored, analyzed, and/or processed as discussed herein within the human mind.

Figure 3:
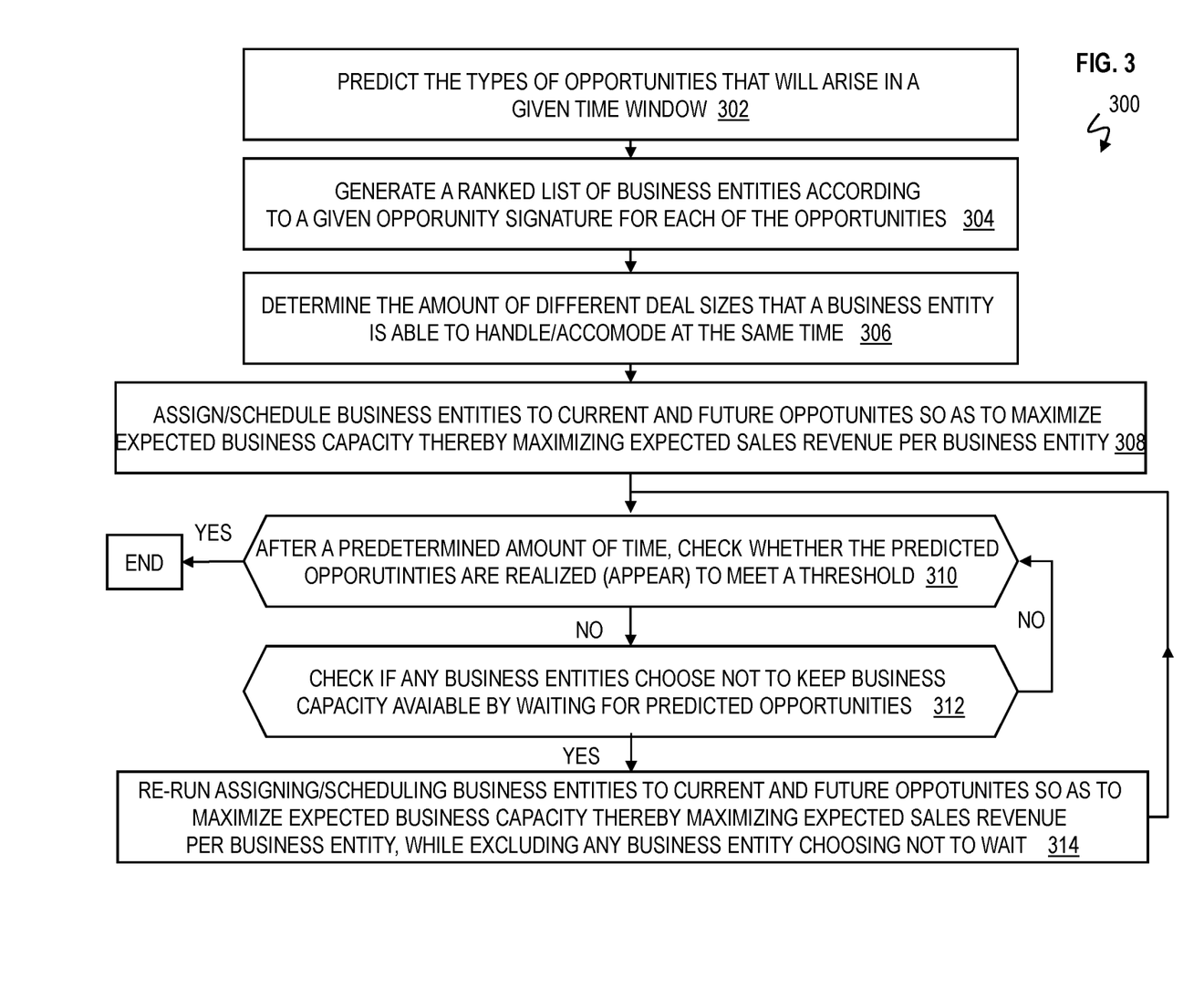
FIG. 3 depicts a flowchart of a computer-implemented process for predictive capacity optimization and/or a predictive capacity optimizer for the entities in accordance with one or more embodiments of the present invention.

FIG. 3 is a flowchart of a computer-implemented process 300 for providing predictive (business) capacity optimization and/or a predictive (business) capacity optimizer for the business entities 225 in accordance with one or more embodiments of the present invention. The computer-implemented process 300 in FIG. 3 can be implemented using system 200 shown in FIG. 2. Accordingly, the computer-implemented process 300 will now be described with reference to system 200 shown in FIG. 2.

At block 302, software applications 204 on computer system 202 are configured to predict a number of new opportunities that will arise in a given time window, along with their respective opportunity signatures. The time window is set in advance and looks out a period of time in the future. The time window can be set for one month, two months, three months, six months, and so forth. The opportunity refers to the ability for a business entity 225 to use its business capacity, such as, for example, computer system 220, to provide a technological service to a client needing the service. The opportunity may include a sales opportunity in which technology services are to be rendered by the business entity. A new opportunity is a predicted opportunity which can also be referred to as a future opportunity that is predicted to occur within the given time window (e.g., one month) by software applications 204. Software applications 204 can include, be integrated with, and/or call an opportunity prediction model 240 to predict the new opportunities. Opportunity prediction model 240 can be implemented using various predictive analytics models and algorithms. Example predictive analytics models can include classification models, clustering models, forecast models, outliers models, time series models, etc., and combinations thereof. Example predictive analytics algorithms can include random forest algorithms, generalized linear model algorithms, gradient boosted model algorithms, K-means algorithms, the prophet algorithms, decision trees, support vector machines (SVM), regression analysis, Bayesian networks, etc., and combinations thereof. Opportunity prediction model 240 is trained on historical data 210. Software applications 204 are configured to collect and maintain historical data for each of the business entities 225, for example, by communicating with computer systems 220. Historical data 210 can be stored in memory 206. Historical data 210 includes historical opportunity records including historical opportunities, opportunity signatures, business entity information, transaction data (e.g., quote, discounts, service agreements, etc.), business entity (seller) details, client details which is the one for whom computing services are provided, business rules, etc. For use with the predictive algorithm of opportunity prediction module 240, the historical data 210 is split into training and test sets. During feature selection, opportunity prediction module 240 iteratively selects the significant features using the training set and verifies that opportunity prediction model 240 using the test set. During model fitting, the parameters are estimated for the selected opportunity prediction model 240. During prediction, opportunity prediction model 240 is fed the newly collected data and generates the corresponding predicted number of new opportunities.

Additionally, software applications 204 are configured to receive input of time window, time threshold, predicted opportunities threshold, and accuracy threshold. Two distinct percentage values "t" and "f" are used, where "t" is a percentage of the number of predicted opportunities and "f" is a percentage of the size of the time window. Whenever the number of opportunities that arose at the time $t_0+(\Delta t*f)$ is less than "t", monitoring module 248 is configured to send a notification to the business entity (which can include a sales manager) as discussed further herein. Historical data 210 is continuously updated and/or periodically updated. Software applications 204 (e.g., using opportunity prediction model 240) are configured to receive as input historical data 210 and the length of the time window within which the predictions are to fall. The size of the time window is $\Delta t$ (e.g., one month). For each new opportunity, software applications 204 are configured to generate a confidence level for the predicted opportunity to arise within the time window $[t_0, t_0+\Delta t]$, where $t_0$ is the starting point (e.g., the first day of a given month). The historical data 210 are used to estimate the variation of the prediction, which is assumed to follow a normal distribution. The confidence level is determined by multiplying the significance value from the normal distribution at the desired confidence level by the estimated variation. Software applications 204 (e.g., using opportunity prediction model 240) are configured to predict (as output) a number of new opportunities and an opportunity signature for each opportunity predicted. The opportunity signature is the type of opportunity. For example, each opportunity signature can include a sector, a deal size, and/or product family. The sector refers to the business space of the opportunity such as, for example, public sector, government sector, private sector, banking sector, educational, etc. The deal size refers to the magnitude of the opportunity and/or the business capacity (e.g., including the computing resources of computer system 220) needed to fulfill the opportunity. For example, the deal size can include small deals, medium deals, and large deals. The product family refers to the technological area of the opportunity, and the technological services/products that a business entity is provide for the opportunity. For example, the product family can include machine learning products, computer security products, chatbot products, data storage products, etc.

At block 304, software applications 204 on computer system 202 are configured to generate a rated list of business entities 225 according to a given opportunity signature for each of the opportunities. For example, if there are three new opportunities, then software applications 204 generate three separate ranked lists according to the expertise of each business entity 225, such that there is one ranked list for each of the three new opportunities. Each business entity 225 is ranked according to its ability to fulfill the requirements in the opportunity signature of the new opportunity and/or its potential to win the new opportunity. For example, software applications 204 ranks each business entity 225 in the ranked list for a particular opportunity using a confidence score which indicates how each business entity is able to fulfill the requirements in the opportunity signature for the particular opportunity. Software applications 204 can include, be integrated with, and/or call an expert recommendation module 242 to rank business entities in the list. In order to generate the ranked list of business entities, software applications 204 (e.g., using expert recommendation module 242) are configured to receive as input historical data 210, type of business entity, and the predicted opportunity signature for a new opportunity. In one or more embodiments, software applications 204 (e.g., using expert recommendation module 242) can weigh the input to generate a confidence score based on which business entities have the ability to fulfill the requirements in the opportunity signature based on their respective historical data 210. Expert recommendation module 242 can use one or more algorithms to balance determining the ability to fulfill the requirements in the opportunity signature such as sector, deal size, and/or product family. Example algorithms can include a content based filtering algorithm that checks the similarity between an opportunity signature and experts' previous expertise (for a business entity) calculated from the previous opportunities that the experts dealt with, and cluster modeling where the similar experts (of a business entity) can be clustered based on their expertise and the most similar cluster of experts can be recommended for an opportunity considering the opportunity requirements.

In one or more embodiments, expert recommendation module 242 can score (e.g., 1-5, where 5 is the highest/best) the ability for each business entity to meet/fulfill each factor (e.g., sector, deal size, product family) of the opportunity signature for a particular opportunity, and the score for each factor in the opportunity can be added to compile a confidence score for a given business entity. One or more components in the opportunity signature can be given greater weight in formulating the confidence score for business entities. For example, the score for product family can be give more weight than other components such as sector and deal size, while deal size can be given more weight than sector, such that sector has the least weight of all components. In one case, as recognized by parsing through historical data 210 for a business entity, software applications 204 determines that the given business entity has upgraded its storage capacity in computer systems 220. When the product family of a new opportunity requires intensive storage capabilities, software applications 204 generate a high score for product family for the given business entity because of its upgraded storage capacity.

At block 306, software applications 204 on computer system 202 are configured to determine the amount of different deal sizes that a business entity 225 (e.g., computer systems 220) can handle/accommodate at the same time, for example, based on capacity of computer systems 220. Software applications 204 can include, be integrated with, and/or call a capacity model 244. In one or more embodiments, capacity model 244 can be modelled as an integer knapsack problem where deals correspond to items, the deal sizes map to item weights, the item profit is equal to the item weight, and weight limit represents the maximum capacity (e.g., maximum (computing) capacity of computer systems 202) of a business entity. Although integer knapsack problem is one example, it should be appreciated that various algorithms can be used. Capacity model 244 receives historical data 210 as input and outputs for each business entity the different combinations of deal sizes that a given business entity can perform at the same time (i.e., business capacity). As an example combination for a given business entity 225, it is assumed that a given business entity 225 via computer system 220 can accommodate and/or work on at the same time (a) three opportunities of small deal size or two opportunities of medium deal size; (b) one small deal size and one medium deal size; or (c) a single opportunity of big deal size.

At block 308, software applications 204 on computer system 202 are configured to assign/schedule business entities 225 to current opportunities and future opportunities (e.g., assignments 250) so as to maximize use of expected business capacity utilization of computer systems 202 per business entity, thereby maximizing expected sales revenue per business entity. Current opportunities are presently available and known in opportunities database 208. New opportunities also referred to as predicted opportunities are the future opportunities predicted by software applications 204 and which are not presently available but are expected to be available in the time window. Software applications 204 can include, be integrated with, and/or call a scheduling module 246. Scheduling module 246 is configured to receive as input opportunity signatures of predicted opportunities from opportunity prediction model 240, ranked lists of business entities 225 who are the most qualified for accommodating/handling the predicted opportunities from expert recommendation module 242, distribution of the currently open opportunities from opportunities database 208, expertise/skills of each business entity 225 (e.g., certificate of a business entity for providing (or selling) product P and/or number of opportunities a business entity had in the past in sector S (historical data 210)), and/or business capacity (computing resources of computer systems 220) of each business entity.

In one or more embodiments, the scheduling problem can be modelled as a Team Orienteering Problem (TOP) with stochastic rewards for software applications 204 (e.g., using scheduling module 246). In the model, a complete graph G is defined, with nodes that represent opportunities $O_i$ each associated with an uncertain business capacity (reward/profit) $R_i$ with probability $p_i$ from opportunity prediction model 240, and edges that represent the duration required to close the opportunity representing the originating node. The duration describes the time it would likely take for revenue from an opportunity to be realized. The optimization seeks to maximize expected business capacity (which in turn seeks to maximize profit) over all active opportunities, given a business entity profile (e.g., sales team profile) and a time budget (e.g., end-of-quarter). Opportunities can be skipped if filling business capacity (e.g., reward) likelihood is low (i.e., business utilization is, for example, 50%, 40%, 30%, and/or less of computing resources of computer system 220 for a given business entity). The output is generated by software applications 204 and sent to respective business entities 225, for example, business entities A, B, through N via respective computer systems 220. The output includes assignments 250 of predicted opportunities to business entities 225, where assignments 250 of opportunities to business entities 225 is so that business entities 225 will have enough business capacity to handle future opportunities given current opportunities. Current opportunities are sales opportunities the business entity is currently working on using business resources (e.g., computer system 220).

At block 310, software applications 204 on computer system 202 are configured to, after a predetermined amount of time, check whether the predicted opportunities are realized (e.g., appear and are manifested a point in time subsequent to when the opportunities were initially predicted) to meet at threshold. For example, the threshold to be met could be 70% by a predetermined amount of time after their initial prediction. If all predicted assignments are realized, the flow ends because the prediction of future opportunities is 100% correct/accurate in the predetermined amount of time after their initial prediction (i.e., threshold met). Software applications 204 can include, be integrated with, and/or call a monitoring module 248. Monitoring module 248 (and/or software applications 204) can receive as input opportunity signatures of predicted opportunities within the time window $[t_0, t_0+\Delta t]$ from opportunity prediction model 240, threshold "t" as minimum percentage of opportunities that should have arisen within a fraction "f" of the time window, and distribution of the currently open opportunities from opportunities database 208.

Monitoring module 248 (and/or software applications 204) can send output business entities 225 as an update. Whenever at the time $t_0+(\Delta t \cdot f)$ the number of opportunities arose (i.e., realized) is less than the threshold "t", software applications 204 are configured to send a notification to the business entities 225. Whenever the distribution of open opportunities differs from the recommendation of assignments 250 by scheduling module 246, scheduling module 246 is configured to re-assign the predicted opportunities accordingly which can include reassigning the predicted opportunity to the second most qualified business entity if the first most qualified business entity has been assigned to a big size deal which will take all its business capacity for the entire time window. After an assignment is generated, monitoring module 248 tracks the new opportunities that are entered into the opportunities database 208. Once an opportunity is created, the opportunity enters in the opportunities database 208 with state OPEN. Monitoring module 248 looks to the open opportunities and checks whether they match the predicted ones for the current time window. Once the predicted opportunities are identified, the monitoring module 248 check whether these opportunities are assigned to the recommended business entities.

Optionally, at block 312, if the predetermined amount of time has passed without the threshold amount of predicted opportunities being realized (i.e., the threshold is not met), software applications 204 are configured to check if any businesses entities choose not to keep business capacity available (i.e., choose not to keep computing resources on computer systems 220 available) by waiting for the predicted opportunities. If not, flow proceeds to block 310. If yes, at block 314, software applications 204 on computer system 202 are configured to re-run the assigning/scheduling of business entities 225 to current and future opportunities so as to maximize use of expected business capacity per business entity thereby maximizing expected sales revenue per business entity, while excluding any business entity choosing not to wait for the predicted opportunities.

Various example scenarios are discussed for explanation purposes and not limitation. The concepts discussed and described in various examples can be combined across scenarios in accordance with one or more embodiments. At the start of the system, opportunity prediction model 240, expert recommendation module 242, and capacity model 244 are trained using the historical data 210 and are updated periodically afterwards. The opportunity prediction model 240 predicts the arrival of new opportunities in the next month, for example, three new opportunities on data privacy products, two medium size opportunities in the banking sector, and one opportunity of big size on natural language processing (NLP) analytics products. Given the opportunity signature (i.e., sector, deal size, product family) of the predicted opportunities, expert recommendation module 242 produces a ranked list of business entities 225 ordered by the confidence score of each business entity to win the specific opportunity based on being able to fulfill the requirements in the opportunity signature. Given the opportunity signature of the predicted opportunities, the ranked list of business entities 225 for each opportunity, and the business capacity of each business entity provided by capacity model 244, scheduling module 246 produces an assignment of opportunities (e.g., assignment 250) to business entities so as to maximize the use of their business capacity (e.g., maximize use and available computing resources of their respective computer systems 220) (thereby maximizing expected sales revenue). Monitoring module 248 checks whether the produced assignment 250 is applied, and in case it is not applied, monitoring module 248 requires scheduling module 246 to generate a new assignment 250. Applying the assignment 250 by business entities 225 in the assignment 250 causes configuration of computer systems 220 to meet the requirements of the new opportunity/opportunities for which the computer systems 220 are required to run. Memory, processors, bandwidth, security protocols, etc., are performed on computer systems 220 of business entities in order to meet the new opportunity having the opportunity signature. It is assumed that there is an accuracy threshold of 50%, meaning that at least 50% of the predicted opportunities must be realized in actuality. If less than three of the six predicted opportunities are determined to appear (i.e., be realized) by monitoring module 248 within the first two weeks of the next month (i.e., it is noted that six is the total number of opportunities mentioned in this scenario, having 3 (new opportunities)+2 (medium size opportunities)+1 (opportunity of big size opportunity)), monitoring module 248 sends an alert to business entities 225 because this is less than the 50% threshold. The alert gives the business entities 225 notification that they may choose not to take the predicted opportunity, and if so, rescheduling by scheduling module 246 will occur excluding the business entity that opted out.

In another example scenario, opportunity prediction model 240 is configured to predict possible new opportunities that can arise in the predefined time window. For example, in the next month there is a high probability that the following types opportunities will arise: five opportunities of middle size on machine learning products, one opportunity of large size on computer security products, and one opportunity of large size in the banking sector. Based on output from opportunity prediction model 240, expert recommendation module 242, and capacity model 244, scheduling module 246 is configured to generate a scheduling (e.g., assignments 250) for business entities 225 by load balancing opportunities among business entities 225. An example of assignments 250 is provided by scheduling module 246 as the following. Business entity A who has a lot of experience in generating computer security products via computer systems 220 is assigned to and should be available for working on the large deal size on computer security products. Business entity B who has closed deals and generated software technology (e.g., hosting websites on computer systems, processing secure transactions on processors, etc.) via computer systems 220 in the banking sector in the past is assigned to and should have enough business capacity for handling the upcoming opportunity in the banking sector. Given that there are two opportunities of small size in the education sector and business entity C has technology specialized on this type of deal (e.g., computer templates, software applications, etc., configured to run on computer systems 220 of business entity C), and given that business entity D works on a broader range of deals, scheduling module 246 is configured to assign the two opportunities of small size in the education sector to business entity C so that business entity D will be able (and have computer resources of computer systems 220 available) to handle some of the upcoming opportunities on machine learning products. After making the assignments 250, monitoring module 248 is configured to monitor whether new opportunities appear and business capacity is compliant with the scheduling. Monitoring module 248 needs to look to (e.g., parse) the opportunities database 208 for new opportunities that match the predicted ones. The opportunities database 208 contains information about the business entity to which the opportunity is assigned. Hence, monitoring module 248 can verify whether the recommended assignment is actually respected or not. For example, if 65% (example threshold) of the predicted opportunity has not appeared after two weeks, monitoring module 248 sends an alert to computer systems 220 of the relative business entities 225. After receiving the alert, for business entity A has been assigned on three opportunities, business entity A releases the held business capacity and configuration on its computer systems 220 thereby not waiting for realization of the three opportunities which it has been assigned and declining the assignment; upon monitoring module 248 receiving the refusal from computer systems 220 of business entity A, scheduling module 246 is configured to re-run the scheduling to finding an alternative business entity (e.g., business entity E) who has the business capacity for handling the predicted new opportunity previously assigned to business entity A.

In an example scenario initially without using system 200, a business entity with a lot of experience working with public institutions could miss the chance to work on an opportunity that utilizes a high amount of computing resources (e.g., a highly profitable opportunity) in the public sector because the business entity is currently busy using some portion of it computing resources on one or more smaller opportunities (e.g., working on less profitable opportunities). However, using system 200 in accordance with one or more embodiments, system 200 can predict that an opportunity utilizing/requiring a high amount of computing resources of computing systems 220 (e.g., a highly profitable opportunity) in the public sector is going to arise soon, such that an assigned business entity can optimize the commitment of computing resources on computing systems 220 by feeding the pipeline of the business entity with small-size opportunities so that the business entity will have enough business capacity (including templates for software applications, memory allocated, etc., on computing systems 220) for working on the anticipated deal in the public sector. Accordingly, system 200 optimizes use and/or preparation of computing capacity on computer systems 220 for a given business entity based on prediction of new opportunities.

In an example scenario initially without using system 200, usually big business entities work on a broad range of deals whereas small business entities are specialized on specific type of deals. For example, a not optimal pipeline could assign a deal of a type T to a big business entity A rather than to a smaller business entity B who specializes on the deal of type T. If opportunities of types different than type T come in, business entity A may have already reached its business capacity and/or have at least some of its capacity utilized/taken by deals of type T such that business entity A will not be able to accept the opportunities, whereas business entity B is not qualified for those types of deals. In accordance with one or more embodiments, system 200 predicts that new opportunities of types different than type T will arise soon. Accordingly, system 200 is configured to assign the current opportunity of type T to business entity B so that business entity A will have enough capacity for handling the upcoming opportunities predicted by software applications 204.

It should be appreciated that assignments 250 cause of trigger respective computer systems 220 of respective business entities 225 to allocate/provision, in advance (i.e., pre-allocate) of predicted opportunities being realized, utilization of computing resources on computer systems 220 including memory (including virtual memory), inputs/outputs, processors, software applications, templates for software applications, database structures/creation, etc. This allocation improves the functioning of computer systems 220 by placing computer systems 220 in a preconfigured state to quickly execute services needed by the predicted opportunities before the predicted opportunities are realized. This allocations also allow computer systems 220 to be physically and/or virtually restructured in anticipation of the predicted opportunities.

Figure 4:
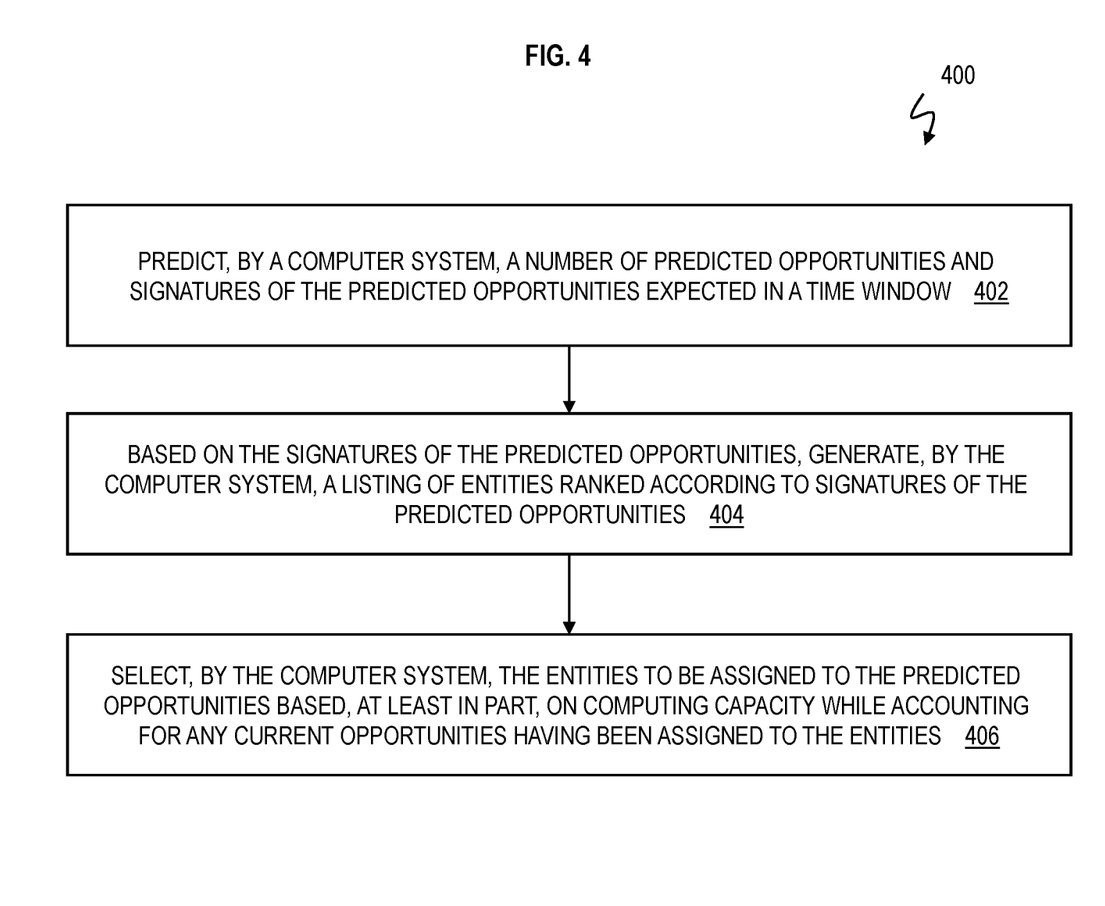
FIG. 4 depicts a flowchart of a computer-implemented method for predictive capacity optimization and/or a predictive capacity optimizer for the entities in accordance with one or more embodiments of the present invention.

FIG. 4 is a flowchart of a computer-implemented method 400 for predictive business capacity optimizer for the business entities 225 in accordance with one or more embodiments of the present invention. The computer-implemented method 400 in FIG. 4 can be implemented using the system 200 shown in FIG. 2. At block 402, software applications 204 (e.g., via opportunity prediction model 240) on computer system 202 are configured to predict a number of predicted opportunities and signatures of the predicted opportunities expected in a time window. At block 404, software applications 204 (e.g., via expert recommendation module 242) on computer system 202 are configured to, based on the signatures of the predicted opportunities, generate a ranked listing of entities (e.g., business entities 225 having computer systems 220) ranked according to signatures of the predicted opportunities. At block 406, software applications 204 (e.g., via scheduling module 246) on computer system 202 are configured to select the entities (e.g., business entities 225 having computer systems 220) to be assigned (e.g., in assignments 250) to the predicted opportunities based, at least in part, on computing capacity related to sales (e.g., determined using capacity model 244) while accounting for any current opportunities having previously been assigned to the entities. Computing capacity related to sales capacity includes the number of opportunities that a business entity can handle at the same time via its computer systems 220.

Selecting the entities assigned to the predicted opportunities based, at least in part, on the computing capacity (e.g., business capacity) is further based, at least in part, on maximizing utilization of computing capacity (e.g., respective computer systems 220 of business entities 225) of the entities that are selected. The computing capacity is determined for each of the entities in the assignments 250. The computing capacity for an entity is based on an amount of total opportunities that the entity can accommodate simultaneously using its computer systems 220. One signature of the signatures (e.g., opportunity signatures) includes a sector, a size, and a product type for one predicted opportunity. The predicted opportunities are monitored (e.g., via monitoring module 248) for a predetermined time to determine if the number of predicted opportunities that are realized meets a threshold. Responsive to the threshold not being met, the computer system 202 is configured to re-select the entities to be assigned to the predicted opportunities while one or more of removing any entities choosing not to participate.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
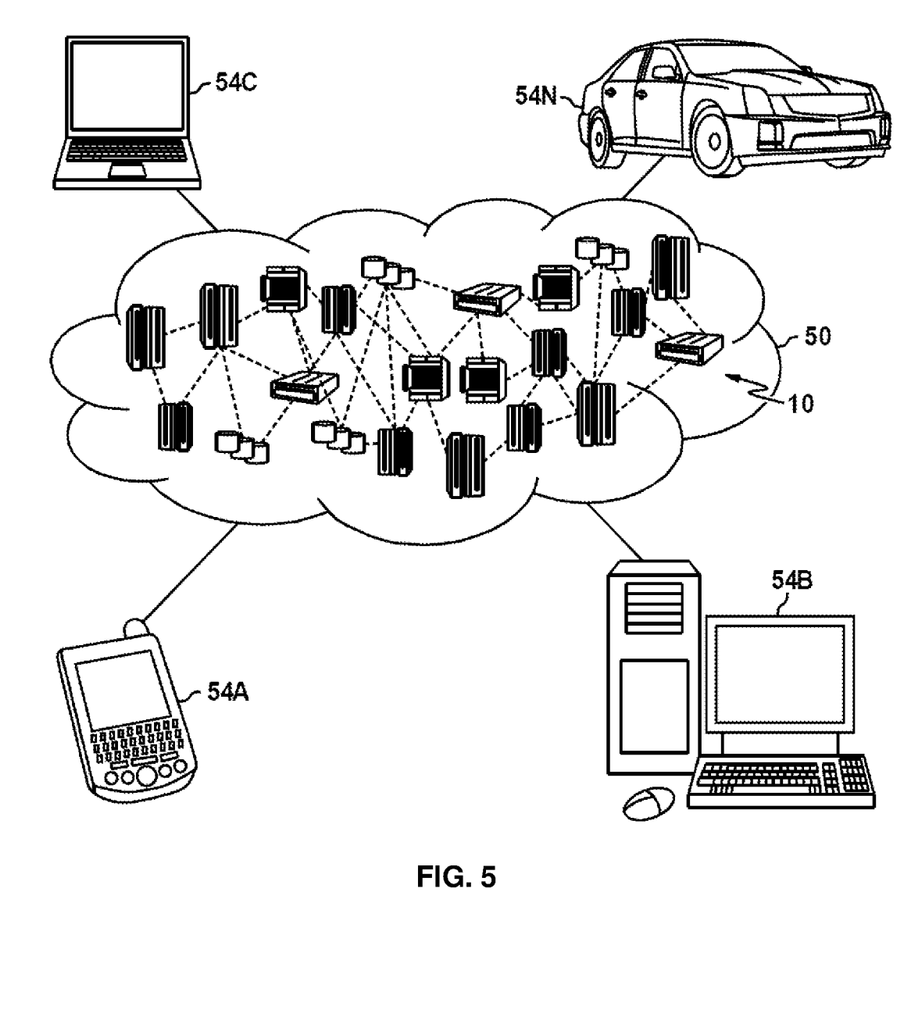
FIG. 5 depicts a cloud computing environment according to one or more embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
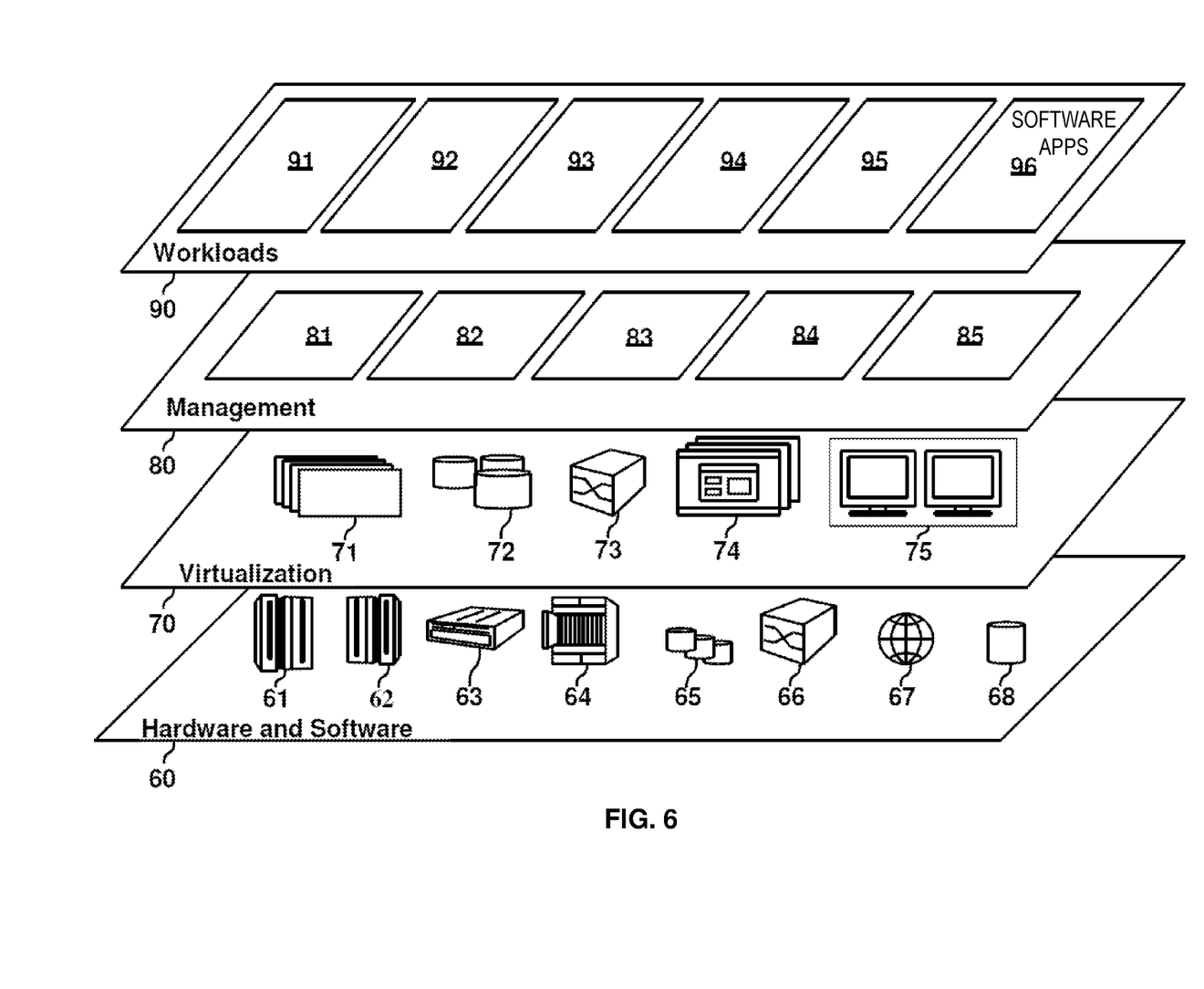
FIG. 6 depicts abstraction model layers according to one or more embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications (e.g., software applications 204, provisioning software application 222, opportunity prediction model 240, expert recommendation module 242, capacity model 244, scheduling module 246, monitoring module 248, etc.) implemented in workloads and functions 96. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   predicting, by a computer system, a number of predicted opportunities for allocation on computer systems of entities and signatures of the predicted opportunities expected in a time window;
   training, by the computer system, an opportunity prediction model, executed by a predictive analytics algorithm, on a historical data of the entities;
   splitting, by the computer system, the historical data of the entities into a training set and a test set;
   selecting iteratively, by the computer system, a plurality of features using the training set and verifying the opportunity prediction model using the test set;
   based on the signatures of the predicted opportunities, generating, by the computer system, a listing of the entities ranked according to the signatures of the predicted opportunities;
   selecting, by the computer system, the entities to be assigned to the predicted opportunities based, at least in part, on computing capacities related to the computer systems of the entities while accounting for any current computing usage having been assigned to the entities;
   based on an output from the opportunity prediction model, generating a scheduling of assignments for entities by load balancing opportunities among entities;
   assigning a computing capacity of an entity to at least one predicted opportunity of the predicted opportunities based, at least in part, on a ranking in the listing of entities of how the entity is able to fulfill requirements of the at least one predicted opportunity according to a signature for the at least one predicted, wherein a size of the at least one predicted opportunity corresponds to a magnitude of the computing capacity of the entity assigned to fulfill the at least one predicted opportunity; and
   causing, by a software application of the computer system, the computer systems of the entities having been selected to respectively pre-allocate the computing capacities of the computer systems for the predicted opportunities, in advance of the predicted opportunities being executed on the computer systems of the entities having been selected, wherein the software application schedules assignments of the predicted opportunities to cause pre-allocation of the computing capacities of the computer systems.

2. The computer-implemented method of claim 1, wherein
   the selecting the entities assigned to the predicted opportunities based, at least in part, on the computing capacities is further based, at least in part, on maximizing utilization of the computing capacities of the entities that are selected.

3. The computer-implemented method of claim 1, wherein
   the computing capacity is determined for each of the entities.

4. The computer-implemented method of claim 1, wherein a computing capacity for an entity is based on an amount of total opportunities that the entity can accommodate simultaneously.

5. The computer-implemented method of claim 1, wherein one signature of the signatures comprises a sector and a product type for one predicted opportunity.

6. The computer-implemented method of claim 1, wherein the predicted opportunities are monitored for a predetermined time to determine if the number of predicted opportunities that are realized meets a threshold.

7. The computer-implemented method of claim 6, wherein responsive to the threshold not being met, the computer system is configured to re-select the entities to be assigned to the predicted opportunities while removing any entities choosing not to participate.

8. A system comprising:
   a memory having computer readable instructions; and
   one or more processors for executing the computer readable instructions, the computer readable instructions controlling the one or more processors to perform operations comprising:
   predicting, by the one or more processors, a number of predicted opportunities for allocation on computer systems of entities and signatures of the predicted opportunities expected in a time window;
   training, by the one or more processors, an opportunity prediction model, executed by a predictive analytics algorithm, on a historical data of the entities;
   splitting, by the one or more processors, the historical data of the entities into a training set and a test set;
   selecting iteratively, by the one or more processors, a plurality of features using the training set and verifying the opportunity prediction model using the test set;
   based on the signatures of the predicted opportunities, generating, by the one or more processors, a listing of the entities ranked according to the signatures of the predicted opportunities;
   selecting, by the one or more processors, the entities to be assigned to the predicted opportunities based, at least in part, on computing capacities related to the computer systems of the entities while accounting for any current computing usage having been assigned to the entities;
   based on an output from the opportunity prediction model, generating a scheduling of assignments for entities by load balancing opportunities among entities;
   assigning a computing capacity of an entity to at least one predicted opportunity of the predicted opportunities based, at least in part, on a ranking in the listing of entities of how the entity is able to fulfill requirements of the at least one predicted opportunity according to a signature for the at least one predicted, wherein a size of the at least one predicted opportunity corresponds to a magnitude of the computing capacity of the entity assigned to fulfill the at least one predicted opportunity; and causing, by a software application executed on the one or more processors, the computer systems of the entities having been selected to respectively pre-allocate the computing capacities of the computer systems for the predicted opportunities, in advance of the predicted opportunities being executed on the computer systems of the entities having been selected, wherein the software application schedules assignments of the predicted opportunities to cause pre-allocation of the computing capacities of the computer systems.

9. The system of claim 8, wherein the selecting the entities assigned to the predicted opportunities based, at least in part, on the computing capacities is further based, at least in part, on maximizing utilization of the computing capacities of the entities that are selected.

10. The system of claim 8, wherein a computing capacity is determined for each of the entities.

11. The system of claim 8, wherein a computing capacity for an entity is based on an amount of total opportunities that the entity can accommodate simultaneously.

12. The system of claim 8, wherein one signature of the signatures comprises a sector and a product type for one predicted opportunity.

13. The system of claim 8, wherein the predicted opportunities are monitored for a predetermined time to determine if the number of predicted opportunities that are realized meets a threshold.

14. The system of claim 13, wherein responsive to the threshold not being met, the computer system is configured to re-select the entities to be assigned to the predicted opportunities while removing any entities choosing not to participate.

15. A computer program product comprising a computer readable storage medium having program instructions embodied therewith, the program instructions executable by a processor to cause the processor to perform operations comprising:
 predicting, by the processor, a number of predicted opportunities for allocation on computer systems of entities and signatures of the predicted opportunities expected in a time window;
 training, by the processor, an opportunity prediction model, executed by a predictive analytics algorithm, on a historical data of the entities;
 splitting, by the processor, the historical data of the entities into a training set and a test set;
 selecting iteratively, by the processor, a plurality of features using the training set and verifying the opportunity prediction model using the test set;
 based on the signatures of the predicted opportunities, generating, by the processor, a listing of the entities ranked according to the signatures of the predicted opportunities;
 selecting, by the processor, the entities to be assigned to the predicted opportunities based, at least in part, on computing capacities related to the computer systems of the entities while accounting for any current computing usage having been assigned to the entities;
 based on an output from the opportunity prediction model, generating a scheduling of assignments for entities by load balancing opportunities among entities;
 assigning a computing capacity of an entity to at least one predicted opportunity of the predicted opportunities based, at least in part, on a ranking in the listing of entities of how the entity is able to fulfill requirements of the at least one predicted opportunity according to a signature for the at least one predicted, wherein a size of the at least one predicted opportunity corresponds to a magnitude of the computing capacity of the entity assigned to fulfill the at least one predicted opportunity; and
 causing, by a software application executed on the processor, the computer systems of the entities having been selected to respectively pre-allocate the computing capacities of the computer systems for the predicted opportunities, in advance of the predicted opportunities being executed on the computer systems of the entities having been selected, wherein the software application schedules assignments of the predicted opportunities to cause pre-allocation of the computing capacities of the computer systems.

16. The computer program product of claim 15, wherein the selecting the entities assigned to the predicted opportunities based, at least in part, on the computing capacities is further based, at least in part, on maximizing utilization of the computing capacities of the entities that are selected.

17. The computer program product of claim 15, wherein a computing capacity is determined for each of the entities.

18. The computer program product of claim 15, wherein a computing capacity for an entity is based on an amount of total opportunities that the entity can accommodate simultaneously.

19. The computer program product of claim 15, wherein one signature of the signatures comprises a sector, and a product type for one predicted opportunity.

20. The computer program product of claim 15, wherein:
 the predicted opportunities are monitored for a predetermined time to determine if the number of predicted opportunities that are realized meets a threshold; and
 responsive to the threshold not being met, the computer system is configured to re-select the entities to be assigned to the predicted opportunities while removing any entities choosing not to participate.

* * * * *